US00RE43756E

(19) United States
(12) Reissued Patent
Christopher et al.

(10) Patent Number: US RE43,756 E
(45) Date of Reissued Patent: Oct. 23, 2012

(54) RAPID FEED PAINTBALL LOADER WITH PIVOTABLE DEFLECTOR

(75) Inventors: James T. Christopher, Sasche, TX (US); Albert Schilling, Clarksville, AR (US); Chris Goddard, Aubrey, TX (US)

(73) Assignee: KEE Action Sports I LLC, Sewell, NJ (US)

(21) Appl. No.: 11/031,952

(22) Filed: Jan. 7, 2005

Related U.S. Patent Documents

Reissue of:
(64) Patent No.: 6,502,567
Issued: Jan. 7, 2003
Appl. No.: 09/689,573
Filed: Oct. 12, 2000

U.S. Applications:
(63) Continuation-in-part of application No. 09/465,440, filed on Dec. 16, 1999, now Pat. No. 6,213,110.

(51) Int. Cl.
*F41B 11/02* (2006.01)
(52) U.S. Cl. ..... 124/51.1; 124/48; 221/258
(58) Field of Classification Search ..... 124/41.1, 124/45, 42, 47, 48, 49, 50, 51.1, 53, 56; 221/277, 221/311, 258
See application file for complete search history.

(56) References Cited

U.S. PATENT DOCUMENTS 1,332,992 A * 3/1920 Moore et al. ..... 124/6
(Continued)

FOREIGN PATENT DOCUMENTS

DE 876370 5/1953
(Continued)

OTHER PUBLICATIONS

WARPIG—World And Rigional Paintball Information Guide, http://www.warpig.com/paintball/tachnical/loaders/halo/index.shtml, WARPIG.COM, Odyssey Readies Halo for Production, By Bill Mills, Jun. 2001, pp. 1 to 6.

(Continued)

*Primary Examiner* — Gabriel Klein
(74) *Attorney, Agent, or Firm* — Volpe and Koenig, P.C.

(57) ABSTRACT

A rapid feed paintball loader for use upon a conventional paintball gun. The rapid feed paintball loader includes a container for holding a plurality of paintballs. At a bottom portion of the container is a rotatable drive cone having a plurality of vertical fins. Each fin forms a gap with an adjacent fin large enough to accommodate a paintball. At the bottom of the container is an exit tube which exits from the bottom portion of the container and leads to an inlet tube of the paintball gun. A tube extension is mounted on an interior surface of the container adjacent to the sloped exit portion of the exit tube. The tube extension is mounted at a height which is above the top feed surface of the fins, and which is approximately equal to the radius of a paintball. A pivotable deflector is also mounted on an interior surface of the container adjacent the tube extension to prevent paintball jams from occurring within the interior of the container. The deflector is positioned above the top feed surface of the fins and below the height of the tube extension. The paintball loader also includes a microprocessor to variably control the rotational speed of the drive cone.

REEXAMINATION RESULTS

The questions raised in reexamination proceeding No. 90/009,715, filed Jun. 3, 2010, have been considered, and the results thereof are reflected in this reissue patent which constitutes the reexamination certificate required by 35 U.S.C. 307 as provided in 37 CFR 1.570(e) for *ex parte* reexaminations, or the reexamination certificate required by 35 U.S.C. 316 as provided in 37 CFR 1.997(e) for *inter partes* reexaminations.

108 Claims, 5 Drawing Sheets

U.S. PATENT DOCUMENTS

| | | | | | |
|---|---|---|---|---|---|
| 1,332,993 | A | * | 3/1920 | Moore et al. | 222/160 |
| 1,403,689 | A | | 1/1922 | Hyndman | |
| 1,403,719 | A | | 1/1922 | Szepe | |
| 1,404,689 | A | | 1/1922 | Fairweather | |
| 1,743,576 | A | * | 1/1930 | Smith | 124/72 |
| 1,867,513 | A | | 7/1932 | Lahti | |
| 1,954,093 | A | | 4/1934 | Nelson | |
| 2,064,088 | A | | 12/1936 | Dickinson | |
| 2,064,888 | A | | 12/1936 | Dickinson | |
| 2,307,015 | A | | 1/1943 | Boynton | |
| 2,338,984 | A | | 1/1944 | Van Horn et al. | |
| 2,357,951 | A | | 9/1944 | Hale | |
| 2,398,263 | A | | 4/1946 | Trimbach | |
| 2,451,521 | A | | 10/1948 | Uglum | |
| 2,526,969 | A | * | 10/1950 | Powers | 68/23.7 |
| 2,568,432 | A | | 9/1951 | Cook | |
| 2,639,904 | A | | 5/1953 | McMaster et al. | |
| 2,641,412 | A | | 6/1953 | Byberg | |
| 2,676,633 | A | * | 4/1954 | Lohre et al. | 99/634 |
| RE23,951 | E | * | 2/1955 | Graham | 68/12.14 |
| 2,716,973 | A | | 9/1955 | Desi | |
| 2,900,972 | A | | 8/1959 | Marsh et al. | |
| 3,089,476 | A | | 5/1963 | Wolverton | |
| 3,134,301 | A | | 5/1964 | Even | |
| 3,248,008 | A | | 4/1966 | Meierjohan | |
| 3,273,553 | A | | 9/1966 | Doyle | |
| 3,384,354 | A | | 5/1968 | Migule et al. | |
| 3,410,453 | A | | 11/1968 | Lawrence | |
| 3,467,073 | A | | 9/1969 | Rhodes | |
| 3,610,223 | A | | 10/1971 | Green | |
| 3,630,118 | A | | 12/1971 | Stoner | |
| 3,695,246 | A | | 10/1972 | Filippi et al. | |
| 3,724,437 | A | | 4/1973 | Halstead | |
| 3,745,687 | A | | 7/1973 | Koon, Jr. | |
| 3,766,901 | A | | 10/1973 | Cleary et al. | |
| 3,777,732 | A | | 12/1973 | Holloway et al. | |
| 3,788,298 | A | | 1/1974 | Hale | |
| 3,789,891 | A | | 2/1974 | Bosch | |
| 3,807,379 | A | | 4/1974 | Vodinh | |
| 3,814,283 | A | | 6/1974 | Cioth | |
| 3,844,267 | A | | 10/1974 | Mohr | |
| 3,855,988 | A | | 12/1974 | Sweeton | |
| 3,867,921 | A | | 2/1975 | Politzer | |
| 3,894,657 | A | | 7/1975 | Eckmayr | |
| 3,930,486 | A | | 1/1976 | Kahelin | |
| 3,978,841 | A | | 9/1976 | Yarur et al. | |
| 3,990,426 | A | | 11/1976 | Stokes | |
| 4,021,036 | A | | 5/1977 | Nelson et al. | |
| 4,027,646 | A | | 6/1977 | Sweeton | |
| 4,034,644 | A | | 7/1977 | Hupp et al. | |
| 4,044,290 | A | | 8/1977 | Gullo | |
| 4,073,280 | A | | 2/1978 | Koehn et al. | |
| 4,112,911 | A | | 9/1978 | Petrick, Sr. | |
| 4,116,192 | A | * | 9/1978 | Scott | 124/51.1 |
| 4,148,415 | A | | 4/1979 | Florida et al. | |
| 4,185,824 | A | | 1/1980 | Natwick | |
| 4,207,857 | A | | 6/1980 | Balka, Jr. | |
| 4,280,697 | A | | 7/1981 | Yuasa | |
| 4,299,383 | A | | 11/1981 | Yuasa | |
| 4,332,097 | A | | 6/1982 | Taylor, Jr. | |
| 4,391,264 | A | | 7/1983 | Abrham et al. | |
| 4,396,193 | A | | 8/1983 | Reinhardt et al. | |
| 4,481,862 | A | | 11/1984 | Wiethoff et al. | |
| 4,487,103 | A | | 12/1984 | Atchisson | |
| 4,502,455 | A | | 3/1985 | Stokes | |
| 4,563,999 | A | | 1/1986 | Miehlich | |
| 4,646,709 | A | | 3/1987 | Kholin | |
| 4,676,137 | A | | 6/1987 | Stockton et al. | |
| 4,695,954 | A | | 9/1987 | Rose et al. | |
| 4,745,842 | A | | 5/1988 | Shou-Fu | |
| 4,748,600 | A | | 5/1988 | Urquhart | |
| 4,759,435 | A | | 7/1988 | Cedrone | |
| 4,765,223 | A | | 8/1988 | Beckmann | |
| 4,770,153 | A | | 9/1988 | Edelman | |
| 4,817,955 | A | * | 4/1989 | Hickson et al. | 473/136 |
| 4,819,609 | A | | 4/1989 | Tippmann | |
| 4,834,060 | A | | 5/1989 | Greene | |
| 4,850,330 | A | | 7/1989 | Nagayoshi | |
| 4,896,646 | A | | 1/1990 | Kahelin et al. | |
| 4,923,066 | A | | 5/1990 | Ophir et al. | |
| 4,926,742 | A | | 5/1990 | Ma et al. | |
| 4,930,400 | A | | 6/1990 | Brandl et al. | |
| 4,936,282 | A | | 6/1990 | Dobbins et al. | |
| 4,951,548 | A | | 8/1990 | Wixon et al. | |
| 4,951,644 | A | | 8/1990 | Bon | |
| 4,965,951 | A | | 10/1990 | Miller et al. | |
| 4,986,251 | A | | 1/1991 | Lilley | |
| 4,993,400 | A | | 2/1991 | Fitzwater | |
| 5,042,685 | A | | 8/1991 | Moulding, Jr. et al. | |
| 5,061,222 | A | | 10/1991 | Suris | |
| 5,063,905 | A | | 11/1991 | Farrell | |
| 5,070,995 | A | | 12/1991 | Schaffer et al. | |
| 5,097,816 | A | | 3/1992 | Miller | |
| 5,097,985 | A | | 3/1992 | Jones | |
| 5,166,457 | A | | 11/1992 | Lorenzetti | |
| 5,233,125 | A | | 8/1993 | Bouver et al. | |
| 5,251,906 | A | | 10/1993 | Heller et al. | |
| 5,282,454 | A | | 2/1994 | Bell et al. | |
| 5,322,283 | A | | 6/1994 | Ritchie et al. | |
| 5,335,579 | A | | 8/1994 | David | |
| 5,337,726 | A | | 8/1994 | Wood | |
| 5,353,712 | A | | 10/1994 | Olson | |
| 5,361,746 | A | | 11/1994 | Szente | |
| 5,383,442 | A | | 1/1995 | Tippmann | |
| 5,456,153 | A | | 10/1995 | Bentley et al. | |
| 5,464,208 | A | * | 11/1995 | Pierce | 473/451 |
| 5,490,493 | A | | 2/1996 | Salansky | |
| 5,497,758 | A | | 3/1996 | Dobbins et al. | |
| 5,505,188 | A | | 4/1996 | Williams | |
| 5,507,271 | A | | 4/1996 | Actor | |
| 5,511,333 | A | | 4/1996 | Farrell | |
| 5,520,171 | A | | 5/1996 | David | |
| 5,542,570 | A | | 8/1996 | Nottingham et al. | |
| 5,555,662 | A | * | 9/1996 | Teetzel | 42/115 |
| 5,561,258 | A | | 10/1996 | Bentley et al. | |
| 5,600,083 | A | | 2/1997 | Bentley et al. | |
| 5,673,812 | A | | 10/1997 | Nelson | |
| 5,675,110 | A | | 10/1997 | Gyre et al. | |
| 5,722,383 | A | | 3/1998 | Tippmann, Sr. et al. | |
| 5,727,538 | A | | 3/1998 | Ellis | |
| 5,736,720 | A | | 4/1998 | Bell et al. | |
| 5,749,797 | A | | 5/1998 | Sunseri et al. | |
| 5,755,056 | A | | 5/1998 | Danner et al. | |
| 5,771,875 | A | | 6/1998 | Sullivan | |
| 5,784,985 | A | | 7/1998 | Lodico et al. | |
| 5,791,325 | A | | 8/1998 | Anderson | |
| 5,794,606 | A | | 8/1998 | Deak | |
| 5,809,983 | A | | 9/1998 | Stoneking | |
| 5,816,232 | A | | 10/1998 | Bell | |
| 5,819,715 | A | * | 10/1998 | Haneda et al. | 124/6 |
| 5,836,583 | A | | 11/1998 | Towers | |
| 5,839,422 | A | | 11/1998 | Ferris | |
| 5,881,962 | A | | 3/1999 | Schmidt et al. | |
| 5,887,578 | A | | 3/1999 | Backeris et al. | |
| 5,947,100 | A | | 9/1999 | Anderson | |
| 5,954,042 | A | | 9/1999 | Harvey | |
| 6,032,395 | A | | 3/2000 | Bentley et al. | |
| 6,055,975 | A | | 5/2000 | Gallagher et al. | |
| 6,062,208 | A | * | 5/2000 | Seefeldt et al. | 124/71 |
| 6,083,105 | A | | 7/2000 | Ronin et al. | |
| 6,085,735 | A | | 7/2000 | Cheek, Jr. | |
| 6,109,252 | A | | 8/2000 | Stevens | |
| 6,206,562 | B1 | | 3/2001 | Eyraud et al. | |
| 6,213,110 | B1 | | 4/2001 | Christopher et al. | |
| 6,220,237 | B1 | | 4/2001 | Johnson et al. | |
| 6,305,367 | B1 | | 10/2001 | Kotsiopoulos et al. | |
| 6,311,682 | B1 | * | 11/2001 | Rice et al. | 124/71 |
| 6,325,233 | B1 | | 12/2001 | Harris | |
| 6,327,953 | B1 | | 12/2001 | Andresen | |
| 6,347,621 | B1 | | 2/2002 | Guthrie | |
| 6,349,711 | B1 | | 2/2002 | Perry et al. | |
| 6,374,819 | B1 | | 4/2002 | Ming-Hsien | |
| 6,408,836 | B1 | | 6/2002 | Ming Hsien | |
| 6,408,837 | B1 | | 6/2002 | Johnson et al. | |
| D459,767 | S | | 7/2002 | Rushton | |
| 6,415,781 | B1 | | 7/2002 | Perrone | |
| 6,418,919 | B1 | | 7/2002 | Perrone | |

6,425,781 B1 7/2002 Bernstein et al.
6,460,530 B1 10/2002 Backeris et al.
6,467,473 B1 10/2002 Kotsiopoulos
6,468,879 B1 10/2002 Lamure et al.
6,481,432 B2 11/2002 Rushton et al.
6,488,019 B2 12/2002 Kostiopoulos
6,502,567 B1 1/2003 Christopher et al.
6,520,854 B1 2/2003 McNally
6,526,955 B1 3/2003 Juan
6,588,412 B2 7/2003 Ferrara et al.
6,591,824 B2 7/2003 Hatcher
6,609,511 B2 8/2003 Kotsiopoulos et al.
6,615,814 B1 9/2003 Rice et al.
6,644,293 B2 11/2003 Jong
6,644,295 B2 11/2003 Jones
6,644,296 B2 11/2003 Gardner, Jr.
6,666,203 B2 12/2003 Madea et al.
6,684,873 B1 2/2004 Anderson et al.
6,701,907 B2 3/2004 Christopher et al.
6,701,909 B2 3/2004 Tiberius et al.
6,708,685 B2 3/2004 Masse
6,722,355 B1 4/2004 Andrews, Jr.
6,725,852 B1 4/2004 Yokota et al.
6,729,321 B2 5/2004 Ho
6,729,497 B2 5/2004 Rice et al.
6,739,322 B2 5/2004 Rice et al.
6,739,323 B2 5/2004 Tippmann, Jr.
6,742,512 B1 6/2004 Ho et al.
6,752,137 B2 6/2004 Brunette et al.
6,792,933 B2 9/2004 Christopher et al.
6,802,306 B1 10/2004 Rice
6,860,258 B2 3/2005 Farrell
6,889,680 B2 5/2005 Christopher et al.
6,899,328 B2 5/2005 Halliburton et al.
6,915,792 B1 7/2005 Sheng
6,978,776 B2 12/2005 Hamilton
6,981,493 B1 1/2006 Poteracke
7,000,603 B1 2/2006 Steenbeke
7,017,569 B2 3/2006 Jong
7,021,302 B2 4/2006 Neumaster et al.
7,040,505 B2 5/2006 Hashimoto et al.
7,077,118 B2 7/2006 Lewis
D535,339 S 1/2007 Broersma
7,159,585 B2 1/2007 Quinn et al.
7,210,473 B2 5/2007 Jong
7,216,641 B2 5/2007 Friesen et al.
7,222,617 B2 5/2007 Andresen
D544,047 S 6/2007 Bell et al.
7,231,914 B2 6/2007 Hatcher
7,234,456 B2 6/2007 Andresen
7,270,120 B2 9/2007 Broersma et al.
7,270,121 B2 9/2007 Lubben
7,322,347 B2 1/2008 Broersma
7,322,348 B2 1/2008 Chen
7,343,909 B2 3/2008 Christopher et al.
D567,302 S 4/2008 Choi
D567,303 S 4/2008 Neumaster
7,357,129 B2 4/2008 Neumaster et al.
7,357,130 B2 4/2008 Broersma
D572,318 S 7/2008 Broersma
7,428,899 B2 9/2008 Andersen
7,441,556 B2 10/2008 Friesen et al.
7,445,002 B2 11/2008 Christopher et al.
7,458,370 B2 12/2008 Chen
D584,776 S 1/2009 Stevens
7,487,769 B2 2/2009 Lubben
7,490,597 B2 2/2009 Hatcher
7,568,478 B2 8/2009 Hedberg
7,617,817 B1 11/2009 Kulp
7,624,726 B2 12/2009 Wood
7,654,255 B2 2/2010 Spicer
7,673,627 B2 3/2010 Higgins et al.
7,694,669 B2 4/2010 Campo
7,762,246 B2 7/2010 Telford
7,770,569 B2 8/2010 Andresen
7,770,571 B2 8/2010 Tippmann, Jr. et al.
7,779,825 B2 8/2010 Estrate
7,832,389 B2 11/2010 Christopher
7,841,328 B2 11/2010 Italia et al.
7,921,835 B2 4/2011 Campo et al.
2001/0029937 A1 10/2001 Hatcher
2001/0039945 A1 11/2001 Rushton et al.
2002/0014230 A1 2/2002 Christopher et al.
2002/0020402 A1 2/2002 Kotsiopoulos
2002/0059927 A1 5/2002 Woods, Sr.
2002/0059928 A1 5/2002 Ferrara et al.
2002/0092513 A1 7/2002 Christopher et al.
2002/0117159 A1 8/2002 Kotsiopoulos et al.
2002/0170552 A1 11/2002 Gardner, Jr.
2002/0175465 A1 11/2002 Halliburton et al.
2003/0005918 A1 1/2003 Jones
2003/0010330 A1 1/2003 Jong
2003/0024520 A1 2/2003 Dobbins
2003/0047173 A1 3/2003 Juan
2003/0047174 A1 3/2003 Tiberius et al.
2003/0079731 A1 5/2003 Dobbins
2003/0121927 A1 7/2003 Rice et al.
2003/0127084 A1 7/2003 Tippmann, Jr.
2003/0127085 A1 7/2003 Brunette et al.
2003/0131835 A1 7/2003 Rice et al.
2003/0168052 A1 9/2003 Masse
2003/0168053 A1 9/2003 Farrell
2003/0188730 A1 10/2003 Maeda et al.
2004/0000300 A1 1/2004 Ho
2004/0074487 A1 4/2004 Christopher et al.
2004/0074489 A1 4/2004 Neumaster et al.
2004/0112356 A1 6/2004 Hatcher
2004/0134475 A1 7/2004 Jong
2004/0194772 A1 10/2004 Hamilton
2004/0211402 A1 10/2004 Christopher et al.
2004/0216728 A1 11/2004 Jong
2004/0245276 A1 12/2004 Hashimoto et al.
2005/0028801 A1 2/2005 Lewis
2005/0121015 A1 6/2005 Postorivo, Jr.
2005/0166904 A1 8/2005 Friesen et al.
2005/0188974 A1 9/2005 Pedicini et al.
2005/0188978 A1 9/2005 Tiberius et al.
2005/0217653 A1 10/2005 Christopher et al.
2005/0241628 A1 11/2005 Hatcher
2005/0274370 A1 12/2005 Lubben
2005/0274371 A1 12/2005 Lubben
2005/0284456 A1 12/2005 Chipley
2005/0284457 A1 12/2005 Hatcher
2006/0005822 A1 1/2006 Quinn et al.
2006/0005823 A1 1/2006 Quinn et al.
2006/0032488 A1 2/2006 Telford
2006/0037597 A1 2/2006 Wood
2006/0042614 A1 3/2006 Broersma
2006/0054151 A1 3/2006 Christopher et al.
2006/0081233 A1 4/2006 Andresen
2006/0081234 A1 4/2006 Andresen
2006/0086347 A1 4/2006 Hedberg
2006/0124118 A1 6/2006 Dobbins
2006/0130821 A1 6/2006 Hamilton
2006/0157040 A1 7/2006 Broersma et al.
2006/0157041 A1 7/2006 Friesen
2006/0196489 A1 9/2006 Campo
2006/0249131 A1 11/2006 Bromersa
2006/0254572 A1 11/2006 Hall
2007/0012303 A1 1/2007 Christopher et al.
2007/0012304 A1 1/2007 Van Dorsser et al.
2007/0017494 A1 1/2007 Andresen
2007/0017495 A1 1/2007 Andresen
2007/0023025 A1 2/2007 Neumaster et al.
2007/0056573 A1 3/2007 Campo
2007/0062506 A1 3/2007 Bell
2007/0081233 A1 4/2007 Hattori
2007/0101981 A1 5/2007 Chen
2007/0113834 A1 5/2007 Spicer
2007/0137631 A1 6/2007 Christopher
2007/0175463 A1 8/2007 Higgins et al.
2007/0181117 A1 8/2007 Tippmann et al.
2007/0215137 A1 9/2007 Jones et al.
2007/0246479 A1 10/2007 Andresen
2007/0256676 A1 11/2007 Orvis et al.
2008/0017178 A1 1/2008 Marques et al.
2008/0047535 A1 2/2008 Handel
2008/0047536 A1 2/2008 Chen

| | | | |
|---|---|---|---|
| 2008/0047537 | A1 | 2/2008 | Kulp et al. |
| 2008/0053422 | A1 | 3/2008 | Estrate |
| 2008/0087264 | A1 | 4/2008 | Postorivo |
| 2008/0141990 | A1 | 6/2008 | Andresen |
| 2008/0178859 | A1 | 7/2008 | Moore et al. |
| 2009/0000608 | A1 | 1/2009 | Christopher et al. |
| 2009/0025700 | A1 | 1/2009 | Andersen |
| 2009/0133680 | A1 | 5/2009 | Christopher et al. |
| 2009/0241929 | A1 | 10/2009 | Italia et al. |

FOREIGN PATENT DOCUMENTS

| | | | |
|---|---|---|---|
| DE | 2035097 | | 1/1972 |
| DE | 2035097 | | 8/1982 |
| DE | 3721527 | | 1/1989 |
| DE | 4343870 | | 6/1994 |
| DE | 4343871 | | 6/1995 |
| DE | 19922589 | | 12/2000 |
| EP | 0075970 | | 4/1983 |
| EP | 01054228 | | 11/2000 |
| EP | 1054228 | | 11/2000 |
| EP | 01653189 | | 5/2006 |
| EP | 1653189 | | 5/2006 |
| FR | 921527 | | 5/1947 |
| GB | 470201 | | 8/1937 |
| GB | 551077 | | 2/1943 |
| GB | 2322438 | | 8/1998 |
| JP | 1179898 | | 7/1989 |
| JP | 6-325233 | | 11/1994 |
| JP | 6-325233 | A | 11/1994 |
| TW | M255391 | | 1/2005 |
| WO | 98/13660 | | 4/1998 |
| WO | 01/44745 | | 6/2001 |
| WO | 02/42708 | | 5/2002 |
| WO | 03/087698 | | 10/2003 |
| WO | 2007/033309 | | 3/2007 |
| WO | 2007/035601 | | 3/2007 |
| WO | 2007033309 | | 3/2007 |
| WO | 2007/044546 | | 4/2007 |
| WO | 2007/044822 | | 4/2007 |
| WO | 2007/098554 | | 9/2007 |
| WO | 2008/104061 | | 4/2008 |
| WO | 2009/009748 | | 1/2009 |

OTHER PUBLICATIONS

WARPIG—World And Rigional Paintball Information Guide, http://www.warpig.com/paintball/tachnical/loaders/halo/review.shtml, WARPIG.COM, Odyssey Halo By Bill Mills, Dec. 2001, pp. 1 to 7.
Odyssey Halo B Paintball Hopper Review, http://www.paintball-gun-review.com/hopper-reviews/odyssey-halo-b . . . , Paintball Gun Review, Odyssey Halo B Paintball Hopper Review, 2004 Paintball-Gun-Review.com, pp. 1 to 3.
WARPIG—World And Regional Paintball Information Guide, http://www.warpig.com/paintball/teachnical/loader/lineup . . . WARPIG Ballistic Labs Loader Speed Comparison, by Bill Mills, Sep. 2001, pp. 1 to 8.
U.S. Appl. No. 90/009,794, filed Jul. 30, 2010, Ex Parte Reexam Request Dated Jul. 30, 2010.
U.S. Appl. No. 90/009,794, filed Jul. 30, 2010, Non Final Office Action Dated Dec. 2, 2010.
U.S. Appl. No. 90/009,794, filed Jul. 30, 2010, Reply to Non-Final Office Action Dated Feb. 3, 2011.
U.S. Appl. No. 90/009,794, filed Jul. 30, 2010, Final Office Action Dated Feb. 14, 2011.
U.S. Appl. No. 90/009,794, filed Jul. 30, 2010, Supplemental Reply to Non-Final Office Action Dated Feb. 16, 2011.
U.S. Appl. No. 90/009,974, filed Jul. 30, 2010, Reply to Final Office Action Dated Apr. 18, 2011.
U.S. Appl. No. 90/009,794, filed Jul. 30, 2010, Advisory Action Dated May 4, 2011.
U.S. Appl. No. 90/009,794, filed Jul. 30, 2010, Notice of Appeal Dated Jun. 15, 2011.
U.S. Appl. No. 90/009,794, filed Jul. 30, 2010, Amendment After Notice of Appeal Dated Aug. 12, 2011.
U.S. Appl. No. 90/009,794, filed Jul. 30, 2010, Supplemental Amendment After Notice of Appeal Dated Aug. 14, 2011.
U.S. Appl. No. 90/009,794, filed Jul. 30, 2010, Appeal Brief Dated Aug. 15, 2011.
U.S. Appl. No. 90/009,794, filed Jul. 30, 2010, Notice of Intent to Issue a Reexam Certificate Dated Sep. 28, 2011.
WARPIG—World And Regional Paintball Information Guide, http://www.warpig.com/paintball/technical/loaders/halo/index.shtml, WARPIG.COM, Odyssey Readies Halo for Production, by Bill Mills, Jun. 2001, pp. 1 to 5.
Odyssey Halo B Paintball Hopper Review, http://www.paintball-gun-review.com/hopper-reviews/odyssey-hao-b . . . , Paintball Gun Review, Odyssey Halo B Paintball Hopper Review, 2004 Paintball-Gun-Review.com, pp. 1 to 4.
www.ODYSSEYPAINTBALL.com, http://web.archive.org/web/20030205112543/http://www.odysseypain . . . , Odyssey Paintball Products, Understanding Halo B, pp. 1 to 3.
WARPIG—World And Regional Paintball Information Guide, http://www.warpig.com/paintball/technical/loaders/halo/index.shtml, WARPIG.COM Odyssey Readies Halo for Production, By Bill Mills, Jun. 2001, pp. 1-6.
WARPIG—World And Regional Paintball Information Guide, http://www.warpig.com/paintball/technical/loaders/halo/index.shtml, WARPIG.COM , Odyssey Halo By Bill Mills, Dec. 2001, pp. 1 to 7.
Odyssey Halo B Paintball Hopper Review, http://www.paintball-gun-review.com/hooper-reviews/odyssey-halo-b . . . , Paintball Gun Review, Odyssey Halo B Paintball Hopper Review, 2004 Paintball-Gun-Review.com, pp. 1 to 3.
WARPIG—World And Regional Paintball Information Guide, http://www.warpig.com/paintball/technical/loaders/evlution/evlution . . . eVLution 2 Sneak Preview, by Bill Mills, Aug. 2001, p. 1 to 4.
WARPIG—World and Regional Paintball Information Guide, http://www.warpig.com/paintball/technical/loaders/evlution/index.shtml Brass Eagle's eVLution Loader, by Bill Mills, Aug. 2000, pp. 1 to 7.
WARPIG—World And Regional Paintball Information Guide, http://www.warpig.com/paintball/technical/labs/revytimes/index/shtml WARPIG Ballistic Labs Report: Revolution Response Times, by Bill Mills, copyright 1992-2010, pp. 1 to 4.

* cited by examiner

RAPID FEED PAINTBALL LOADER WITH PIVOTABLE DEFLECTOR

Matter enclosed in heavy brackets [ ] appears in the original patent but forms no part of this reissue specification; matter printed in italics indicates the additions made by reissue.

RELATED APPLICATIONS

This application is a continuation-in-part of a co-pending U.S. patent application (Ser. No. 09/465,440, entitled "Rapid Feed Paintball Loader", filed Dec. 16, 1999 in the names of James T. Christopher and Albert G. Schilling.

BACKGROUND OF THE INVENTION

1. Technical Field of the Invention

This invention relates to paintball loaders, and more particularly, to a paintball loader which forcibly and rapidly feeds paintballs into a paintball gun.

2. Description of Related Art

Operators of paintball guns are constantly seeking increased performance from paintball guns. Operators use these paintball guns in a war game having two teams of players trying to capture one another's flag. The war game is played on a large field with opposing home bases at each end. Each team's flag is located at the player's home base. In addition, all of the players have a paintball gun that shoots paintballs. These paintballs are gelatin-covered spherical capsules filled with paint. During play of the game, the players on each team advance towards the opposing team's base in hopes of stealing the opposing team's flag, without being eliminated from the war game. A player is eliminated from the game when the player is hit by a paintball fired from an opposing player's gun. When the paintball hits a player, "splat" of paint is left on the player.

Typically, an existing paintball loader includes a housing which is placed on an upper portion of a paintball gun. The housing is shaped to hold a large quantity of paintballs. At the bottom of the housing is an outlet tube through which the paintballs drop by the force of gravity. The outlet tube leads to an inlet tube located on the upper portion of the gun.

During the operation of existing paintball loaders, paintballs sequentially drop by gravity through the outlet tube into the inlet tube of the gun. The inlet tube directs each paintball into the firing chamber of the gun, where the paintball is propelled outwardly from the gun by compressed air.

Co-pending U.S. patent application Ser. No. 09/465,440 describes a paintball feed system providing enhanced performance over existing paintball feed systems by utilizing a drive cone to forcibly feed paintballs into the gun. However, jams may still occur when rapidly feeding paintballs to the gun. Additionally, an operator cannot control the speed at which the paintballs are fed to the gun. A motor which drives the drive cone, has only two speeds at which it operates, zero and full speed. The two speed operation of the motor inefficiently feeds paintballs to the paintball gun. Therefore, to increase the performance of a paintball gun, a paintball loader is needed which reliably and forcibly delivers paintballs to a paintball gun at a rapid, selectable rate, while actively preventing paintball jams.

Thus, it would be a distinct advantage to have an apparatus which feeds the paintballs at a selectable and rapid rate into the paintball gun, while simultaneously actively preventing jams from occurring during the operation of the paintball gun and loader. It is an object of the present invention to provide such an apparatus.

SUMMARY OF THE INVENTION

In one aspect, the present invention is a rapid feed paintball loader for use on a paintball gun. The paintball loader includes a container for holding a plurality of paintballs, a paintball agitating device mounted on a bottom portion of the container, and an exit tube exiting from a side wall near the bottom portion of the container and leading to an inlet tube of the paintball gun. The paintball loader also includes a tube extension mounted on an interior surface of the container adjacent to the exit tube, a motor that rotates the paintball agitating device and a deflector for deflecting paintballs downward into the gaps between the fins or upward to pass over the tube extension. The deflector is pivotably attached to the interior surface of the container adjacent to the tube extension and is mounted at a height above the top feed surface of the agitating device and below a bottom portion of the tube extension. In addition, the paintball loader includes a means for actuating the motor upon demand.

In another aspect the present invention is a rapid feed paintball loader for use on a paintball gun. The paintball loader includes a plurality of fins located at a bottom portion of the container. Each fin has a top surface and with an adjacent fin forms a gap large enough to accommodate a paintball. The paintball loader also includes means for rotating the plurality of fins about an axis running perpendicularly through the bottom portion of the container.

In still another aspect, the present invention is a rapid feed paintball loader which includes a detector for detecting a presence of paintballs at a selected position within the exit tube and a microprocessor which variably controls the speed of the motor. The microprocessor decreases the speed of the motor when receiving a signal from the detector that the presence of paintballs is detected in the exit tube and increases the speed of the motor when receiving a signal from the detector that paintballs are not present in the exit tube.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

A paintball loader for rapidly delivering paintballs at a selectable speed to a paintball gun while actively preventing jams is disclosed.

Figure 1:
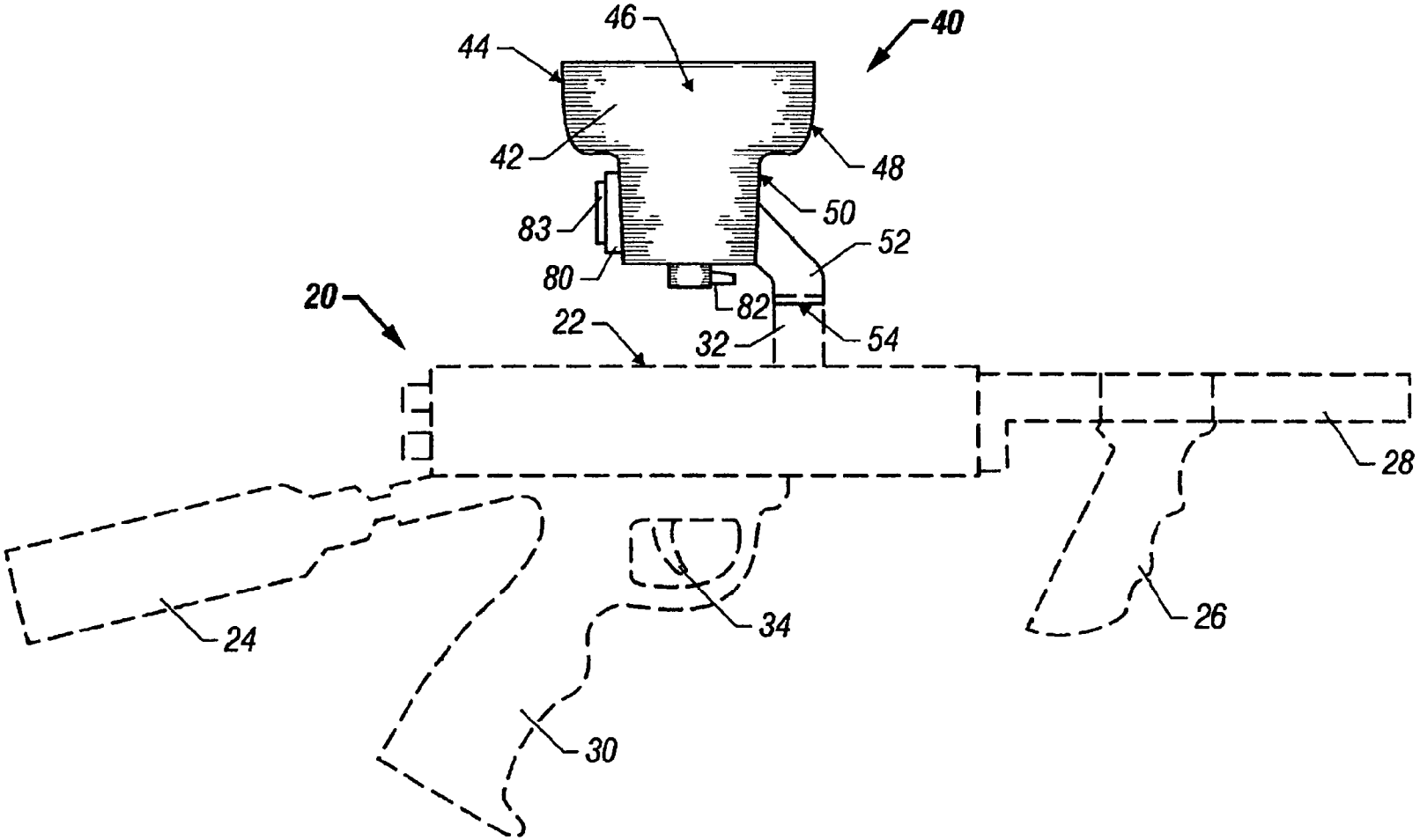
FIG. 1 is a side elevational view of a rapid feed paintball loader constructed in accordance with the teachings of the present invention and operatively attached to a representative paintball gun illustrated in phantom.

FIG. 1 is a side elevational view of a rapid feed paintball loader 40 constructed in accordance with the teachings of the present invention and operatively attached to a representative paintball gun 20 illustrated in phantom. The paintball gun 20 includes a main body 22, a compressed gas cylinder 24, a front handgrip 26, a barrel 28, and a rear handgrip 30. The paintball gun also includes an inlet tube 32 leading to a firing chamber (not shown) in the interior of the main body and a trigger 34. The front handgrip projects downwardly from the barrel and provides an area for gripping by an operator of the paintball gun. The compressed gas cylinder is typically secured to a rear portion of the paintball gun. The compressed gas cylinder normally contains $CO_2$, although any compressible gas may be used.

In operating the paintball gun 20, the trigger 34 is squeezed, thereby actuating the compressed gas cylinder to release bursts of compressed gas. The bursts of gas are used to eject paintballs outwardly through the barrel 28. The paintballs are continually fed by the paintball loader 40 through the inlet tube to the firing chamber. Although FIG. 1 depicts an automatic paintball gun, the paintball gun 20 may also be a semi-automatic gun.

The rapid feed paintball loader 40 includes a paintball container 42 having a container wall 44 forming an interior area 46. The container is divided into an upper portion 48 and a lower portion 50. An exit tube 52 leads from the bottom portion of the container to an outlet opening 54. The exit tube is positioned on top of the inlet tube 32 of the paintball gun 20.

Figure 2:
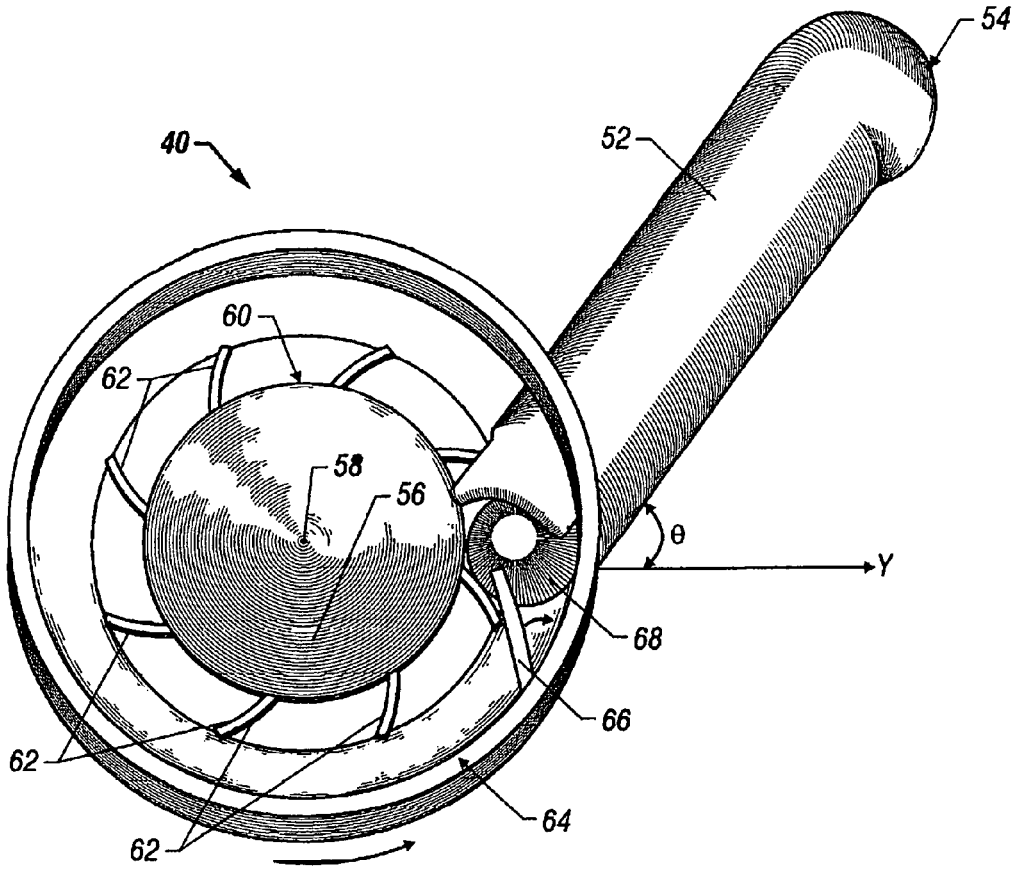
FIG. 2 is a top view of the lower portion of the rapid feed paintball loader of FIG. 1 showing a drive cone.

FIG. 2 is a top view of the lower portion 50 of the rapid feed paintball loader of FIG. 1 showing a drive cone 56. Mounted along a vertical center axis 58, located in the approximate center of the interior area, is the drive cone having a conically-shaped interior surface area 60 with a plurality of fins 62 projecting upwardly from the top surface of the drive cone and spiraling outwardly from an outer circumference of the interior area. The drive cone is rotatably attached to a bottom portion of the paintball container, allowing rotation about the center axis. The exit tube 52 projects outwardly from a rim 64 of the lower portion 50 of the container wall 44 at an approximately 45 degree angle from the Y-axis. In addition, an upper part of the exit tube extends towards the interior area to form a paintball tube extension 72. A pivotable deflector 66 extends inwardly towards the vertical center axis from the rim 64. A paintball 68 is illustrated between two fins.

Figure 3:
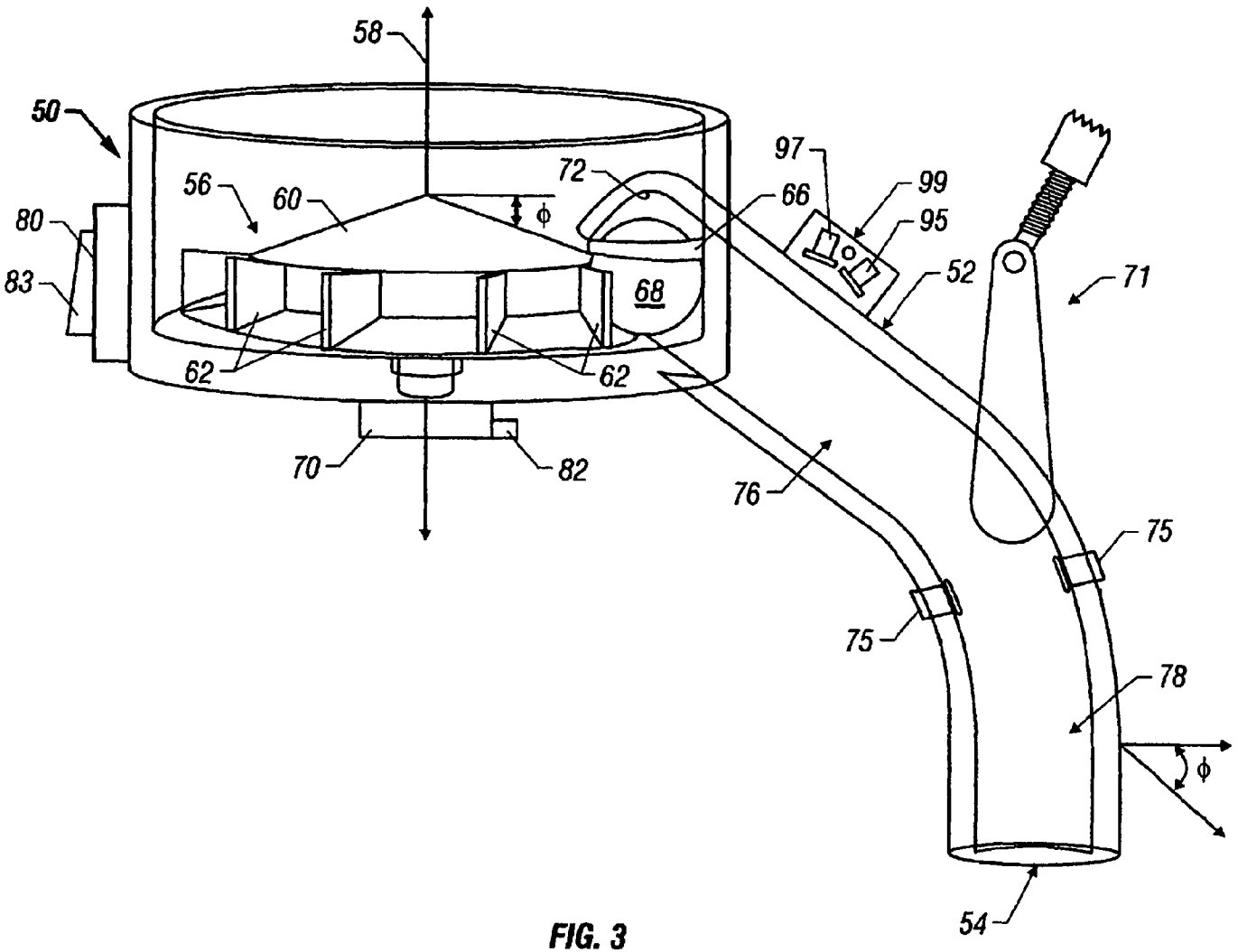
FIG. 3 is a side interior cut-away view of the paintball loader of FIG. 2 illustrating the drive cone, the exit tube, the loaded paintball, a motor, and the paintball tube extension.

FIG. 3 is a side interior cut-away view of the paintball loader illustrating the drive cone 56, the exit tube 52, the loaded paintball 68, a drive motor 70, and the paintball tube extension 72. In the preferred embodiment of the present invention, the container wall 44 is curved and extends upwards to form the upper portion 48 (not shown in FIG. 3). The interior area 46 formed by the container wall stores a plurality of paintballs prior to being used by the paintball gun 20. Although a circular shape is illustrated in the top view of FIG. 2, the container may be any size and shape which permits the paintballs to drop towards the drive cone 50.

The top feed surface of the drive cone, which is the feed surface between the fins 62 where the paintball 68 rests, is sloped downwardly at an angle of Φ (approximately 45 degrees in the preferred embodiment). The surface may slope at any angle which matches the slope of the exit tube and allows paintballs to feed into the exit tube 52. The exit tube is a circular tube with an inside diameter slightly larger than a conventional paintball. The exit tube leads from an entry opening 74 to the outlet opening 54 which engages with the inlet tube 32 of the paintball gun. The exit tube includes a sloped exit portion 76 and a vertical outlet portion 78. In the preferred embodiment of the present invention, the sloped exit portion of the exit tube is sloped downwardly at an angle of approximately Φ, which is the same slope as the top feed surface of the drive cone. The pivotable deflector 66 is positioned above the top portion of the fins 62 and below the tube extension 72.

The tube extension 72 is located at the entry opening 74. The tube extension is an extension of the exit tube 52. The tube extension extends towards the center axis 58, while maintaining a clearance above the fins 52. The paintball tube extension is formed as a scoop which has an interior radius of curvature approximately equal to the curvature of a paintball. The top of the scoop is positioned so that it partially covers a paintball that is pushed into position by the fins at the entry opening 74 of the exit tube. In this manner, the sloped surface of the drive cone, the radially curved fins, the angled orientation (approximately 45 degrees) of the exit tube, and the tube extension all equate to forcibly drive the paintball into the exit tube.

The drive cone 56 is rotated around the center axis 58 by the drive motor 70. The motor 70 may be a conventional dc electric motor powered by a power supply 80, such as a 9-volt battery. The power supply is illustrated as being located on the outer surface of the container 42, however, the power source may be located in any position which allows the power source to supply power to the motor. The paintball loader 40 may also includes an electro-mechanical motor-actuator switch 71 located in an interior portion of the exit tube 52.

In the preferred embodiment of the present invention, the paintball loader 40 may also include a microprocessor 82 to enhance the performance of the loader as well as providing useful information to a paintball gun operator. In alternate embodiments, the microprocessor may provide information for the operator on a display 83. The display 83 may be mounted anywhere on the gun or loader which provides an easily visible display to the operator. As illustrated in FIG. 3, the display is located on an outer surface of the container 42. The display may include a backlit background or any device allowing viewing of the display in the dark.

Figure 4:
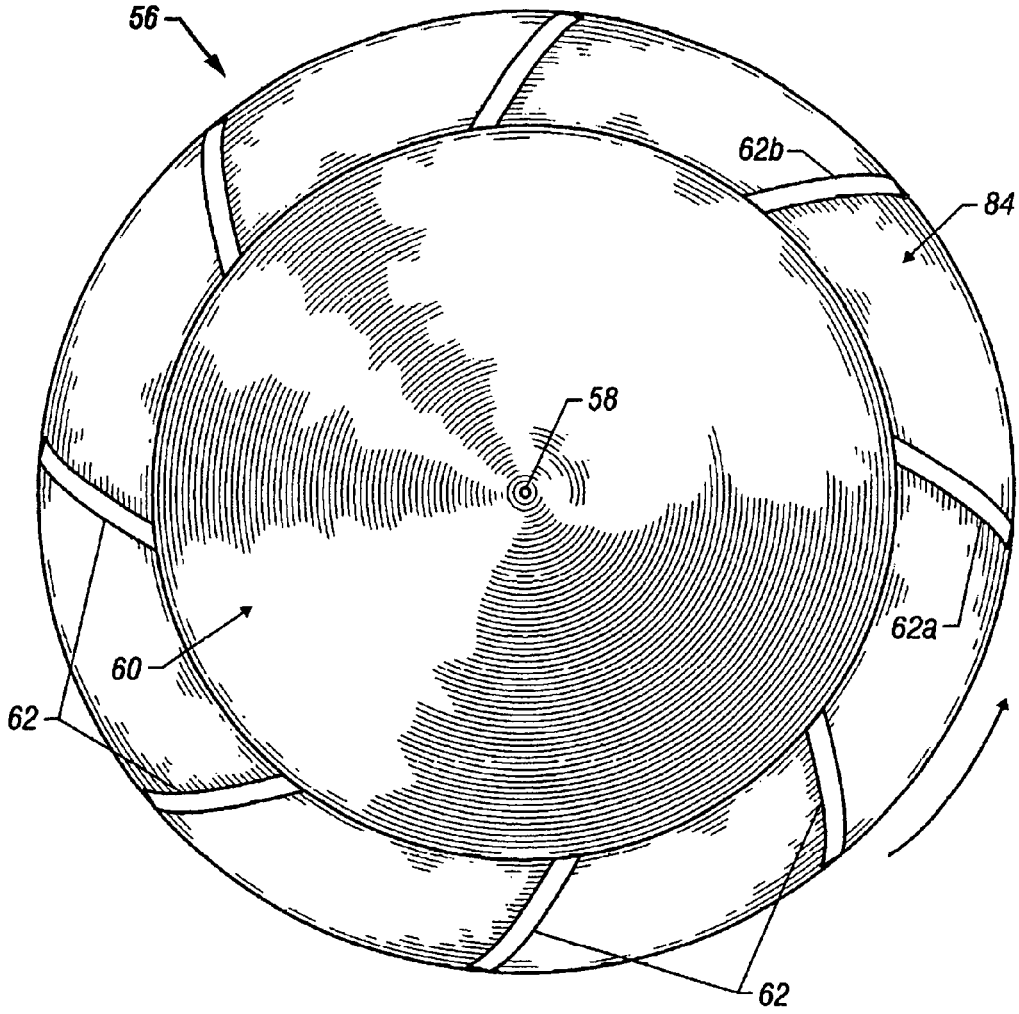
FIG. 4 is a top view of the drive cone of FIG. 2 showing the plurality of fins.

FIG. 4 is a top view of the drive cone 56 of FIG. 2 showing the plurality of fins 62. As discussed above, the plurality of fins originate at the outer circumference of the conically-shaped interior area 60 and spiral outwardly towards the rim 64 of the container wall 44 (not shown in FIG. 4). Each fin forms a gap 84 with an adjacent fin which, at the container wall, is sized slightly larger than a conventional paintball. For example, fins 62a and 62b form the gap to accommodate a conventional paintball. Additionally, each fin curves to the rear as it radiates outwardly from the center axis so that paintballs are pushed outward as well as forward as the drive cone rotates in the forward direction (counterclockwise when viewed from above).

Figure 5:
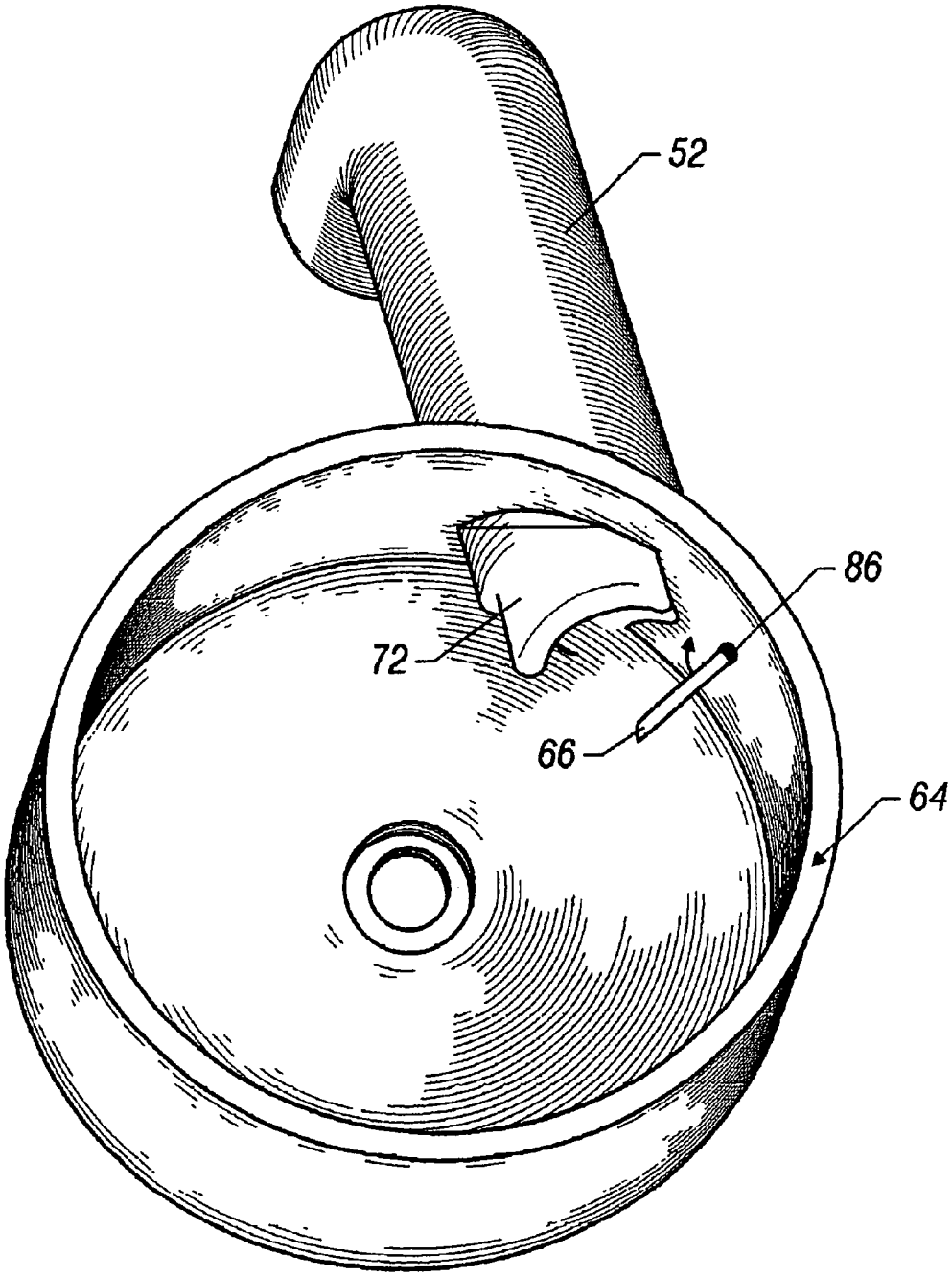
FIG. 5 is a top perspective view of the lower portion of the paintball container with the drive cone removed illustrating the paintball tube extension, pivotable deflector, and exit tube.

FIG. 5 is a top perspective view of the lower portion 50 of the paintball container 42 without the drive cone 56 illustrating the paintball tube extension 72, pivotable deflector 66, and exit tube 52. In the preferred embodiment, the tube extension is concavely shaped to accommodate the paintball 68 by contacting the paintball on its upper half, and guide it into the exit tube. The pivotable deflector is attached to the rim 64 at pivot point 86, allowing the deflector to rotatably move as indicated in FIG. 5.

Referring to FIGS. 1-5, the operation of the rapid feed paintball loader 40 will now be explained. The rapid feed paintball loader is positioned on the top of the paintball gun 20. The loader 40 is connected to the gun by attaching the exit tube 52, at the outlet opening 54, to the inlet tube 32 with an attaching device such as a clamp (not shown).

When an operator of the paintball gun 20 wishes to shoot paintballs, the trigger 34 is squeezed, which actuates the compressed gas cylinder 24. The compressed gas cylinder releases bursts of compressed gas which are used to eject paintballs through the barrel 28. A plurality of paintballs are stored in the paintball container 42 and pass down the exit tube for use by the paintball gun when demanded by the operator.

The plurality of paintballs located in the container 42 rest on top of the drive cone 56. The bottom-most paintballs drop into the plurality of gaps 84. The drive cone is rotated by the drive motor 70, forcing the paintballs outward and downward from the center axis 58 and forward toward the tube extension 72. The pivotable deflector 66 helps prevent jams by causing paintballs to either fall into one of the gaps between the fins or to rise above the tube extension. The paintball 68 is forced into the entry opening 74 of the exit tube 52 by the tube extension. In addition, since the drive cone is downwardly sloped toward the exit tube, the paintball falls downwardly, with the assistance of gravity, and outwardly towards the rim 64.

In the preferred embodiment of the present invention, the tube extension grasps the paintball at an upper portion of the paintball. In addition, in the preferred embodiment, the exit tube extends outwardly from the container 42 at an angle θ of approximately 45 degrees from the Y axis. This 45 degree position provides the optimum orientation to feed paintballs into the exit tube. After the paintball enters the entry opening, the next paintball located in an adjacent gap 84 is sequentially grasped by the tube extension and driven into the entry opening behind the first paintball. Additional paintballs located in the container 42, are drawn downwardly and outwardly by gravity and fill the vacated gaps. Positioning the fins on the outer circumference of the interior dome-shaped area prevents paintballs from being lodged in the upper portions of the gaps.

Once the paintball 68 enters the entry opening 74, it passes through the sloped exit portion 76 to the vertical outlet portion 78 of the exit tube. The sloped exit portion of the exit tube is sloped at approximately the same angle as the top feed surface of the drive cone 56, allowing the paintball to enter the exit tube more easily. As the paintball passes through the exit tube, the paintball may actuate an optional electro-mechanical motor actuator switch (not shown). The motor actuator switch may be utilized to detect the paintball passing through the exit tube. When the paintball enters the exit tube, the motor actuator detects the paintball in the exit tube and shuts off the motor. Thus, when the exit tube fills up with paintballs, the motor is automatically turned off. Then as paintballs vacate the exit tube, the motor actuator does not detect a paintball and engages the motor and rotates the drive cone 56. In this way, the exit tube is always kept full of paintballs, ready for use when demanded by the paintball gun.

Although an electro-mechanical switch has been described to detect the presence of paintballs in the exit tube, it should be understood that other devices may also be utilized to detect the paintballs (e.g., infrared senors, contact pads, optical sensors, etc.), without departing from the scope of the present invention. In the preferred embodiment, a reflective infrared (IR) optical sensor 99 may be utilized. The sensor 99 detects the presence of a paintball in the exit tube by emitting a limited range light from an emitter 95. The range of the light is considerably less than the diameter of the exit tube, however of a sufficient length to strike a paintball located in the exit tube. If a paintball is located within the exit tube, the light emitted from the emitter bounces off the paintball and reflects back to the sensor 99. A detector 97 detects the reflected light, thus detecting the presence of a paintball. However, if a paintball is not located within the exit tube, the light emitted from the emitted does not reflect off any solid object. Due to the limited range of the emitted light, the light does not strike the opposite side of the exit tube.

There are several advantages in utilizing a reflective light sensor such as sensor 99, as compared to existing sensors. First, the sensor is located in one single integrated device. Other existing devices utilize two sensors located in different places. In addition, the sensor 99 does not require as much power as existing sensor systems, since a limited range light beam is utilized. Existing sensors require transmitting a beam across the entire diameter of the exit tube. In existing sensors, a beam of light is constantly projected across an opening. The existing sensors detect when a paintball is not located in the exit tube, rather than when the paintball is located in the exit tube. Specifically, the beam of light in an existing sensor is detected when the paintball is not in the exit tube. The lack of the beam of light being detected by the existing sensor's detector is the indication that the paintball is present in the exit tube. Although the sensor 99 is the preferred embodiment, other types of sensors may be utilized. For example, a plurality of sensors 75 may be used to detect the paintballs as illustrated in FIG. 3.

To remove jams, the drive cone 56 may be reversed by the motor 70. The curvature of the fins tends to push the paintballs upward and inward toward the top of the cone when the cone is rotated in reverse.

In the preferred embodiment, the microprocessor 82 may also be used to monitor jams within the paintball loader. *The microprocessor may momentarily reverse the direction of rotation of the motor 70 in response to a jam. A jam may be detected, for example, when a specified increase in torque output from the motor occurs.* If paintballs jam within the paintball loader, the drive motor experiences additional resistance in rotating the drive cone. This produces increased torque on the motor and a rise in electrical current. This rise is detected by a motor controller which may be, for example, the microprocessor 82. Upon detection of the rise in electrical current, the microprocessor immediately stops the motor to prevent jamming of a paintball within the exit tube. The microprocessor automatically commands the motor to start up after the jam clears. The microprocessor may be attached to the motor 82 or in any position which allows communication with the motor. When the electro-mechanical switch, or other any other type of sensor, detects the presence of a paintball at the top of the exit tube, the sensor sends a signal to the microprocessor. In turn, the microprocessor sends a signal to disengage the motor. When the motor actuator switch does not detect any paintballs within the exit tube, the sensor signals the microprocessor that the exit tube is not full. The microprocessor can then signal the motor to engage and rotate the drive cone, providing additional paintballs to the paintball gun.

The microprocessor may also perform the function of variably controlling the speed of the motor and the rotational speed of the drive cone. In conjunction with a sensor (electro-mechanical actuator switch, infrared sensor, etc.) within the exit tube 52, the microprocessor varies the speed of the motor to support the demand for paintballs. For example, if the exit tube is not full, more paintballs need to be supplied for entry into the paintball gun. The microprocessor then sends a command to the motor to increase the RPM, thus increasing the supply of paintballs to the gun. If the exit tube is full, as detected by the sensor, the motor is stopped by the microprocessor. As the demand for paintballs increases, the microprocessor commands the incremental increase in power to the motor, resulting in an increase in RPM of the drive cone. In existing devices, there are only two speeds associated with the motor, full speed or zero speed. With the use of the microprocessor, the motor can be variably controlled to supply paintballs according to the demand of the gun operator. The use of the microprocessor to variably control the speed of the motor may be utilized on any paintball gun loader requiring the use of a motor to feed paintballs to the paintball gun.

In the preferred embodiment of the present invention, the microprocessor changes the speed of the motor by varying the duty cycle available to the motor 82, rather than changing the voltage delivered to the motor. The duty cycle available to the motor is varied by pulse width modulation, which is a technique well known in the art of electronics. For example, the duty cycle is increased to increase the speed of the motor. Likewise, the duty cycle is decreased by the microprocessor to decrease the speed of the motor. The power utilization of the motor is more efficient by utilizing pulse width modulation to vary the speed of the motor. With low power remaining in a battery, which may be sensed by the microprocessor, the duty cycle may be decreased. This decrease in duty cycle available to the motor allows a battery to provide power to the motor for a longer period of time. Additionally, by utilizing pulse width modulation, any dc electrically powered motor may be used. Thus, an expensive variable speed motor is not necessary to operate the paintball loader 40.

The microprocessor 82 may also be used in conjunction with a display such as an LED or LCD display to present relevant data to the operator of the paintball gun 20. The microprocessor may be used to count the amount of shots fired or shots per second fired by the paintball gun by receiving data from the sensor located within the exit tube 52 (e.g., the number of paintballs passing through the exit tube detected by the sensor). Additionally, the microprocessor may be connected to the power supply 80, displaying the power remaining in the power supply. For example, the microprocessor may monitor the remaining life of a battery, if a battery is used as the power supply. The microprocessor can then present this data to the operator through the display 83, which may be affixed on top of the rapid feed paintball loader, for easy viewing by the operator. As discussed above, the microprocessor may also vary the duty cycle of the electric power in response to the remaining power available from the battery.

A timer (not shown) may also be incorporated into the paintball loader 40. The timer may provide the running time of the game as well as an audio, visual, or vibratory warning to the operator when a predetermined amount of time remains in the game. The timer may be a separate display located on the paintball loader or may be controlled by the microprocessor 82 on the central display 83.

The pivotable deflector 66 provides an active device to prevent the jamming of paintballs within the paintball loader. In existing paintball loaders, a paintball may be lodged between the tube extension or entry opening of the exit tube and one of the fins or "agitators" driving the paintball towards the exit tube, causing the loader to jam and stopping the rotation of the drive cone. To prevent the paintball from lodging between the tube extension (or extension of the exit tube in existing loaders) and a fin (or agitator in existing loaders), the pivotable deflector forces the paintball to either fall into one of the gaps between the fins or to rise upwardly away from the tube extension. In addition, the deflector pivots away from the paintball, thus preventing the paintball from lodging between the fin and the deflector. The deflector, although depicted with the paintball loader 40 illustrated in FIGS. 1-5, may be utilized on any active feed paintball loader to prevent the inadvertent lodging of paintballs between a fin (or other agitating device) and the entry of the exit tube.

The paintball loader 40 provides many advantages over existing paintball loaders. Existing paintball loaders suffer from the disadvantage of numerous jams within the paintball container because of a paintball unintentionally being lodged between an agitating device and the entry way to the exit tube. The paintball loader prevents the jamming of the paintball between the agitating device and the entry way by providing a pivotable deflector to deflect paintballs from lodging in undesirable locations. Thus, the pivotable deflector actively prevents the jamming of paintballs within the paintball loader.

The paintball loader 40 also provides the advantage of variably controlling the feed rate of the paintballs to the paintball gun. In existing paintball loaders, the motor driving the agitating device has only two speeds, full speed and zero speed. The paintball loader 40 provides a full range of speeds of the motor to change the speed at which the paintballs are delivered to the paintball gun. A sensor or plurality of sensors within the exit tube provide the microprocessor information when the demand. increases for paintballs, as indicated by an empty or half full exit tube. The microprocessor and sensor located within the exit tube may be used in any paintball loader, thus providing variable feed rates to the paintball gun.

The paintball loader 40 also enhances the feed rate of the paintballs to the paintball gun by orientating the exit tube at approximately a 45 degree angle from the Y axis of the paintball loader. This orientation provides the optimum position to feed paintballs into the exit tube, thus increasing the delivery rate to the paintball gun.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A rapid feed paintball loader for use on a paintball gun, the paintball loader comprising:

a container for holding a plurality of paintballs *having an interior space*;

a paintball agitating device mounted on a bottom portion of the container, *said paintball agitating device including a plurality of fins, said fins forming gaps therebetween; wherein the paintball agitating device includes a drive cone rotatably mounted on a bottom portion of the container, said drive cone having a top feed surface that slopes downward from a center axis of said drive cone; and*

*the plurality of fins affixed to the top feed surface of the drive cone, each fin having a top feed surface and forming a gap with an adjacent fin large enough to accommodate a paintball*;

a motor that rotates the paintball agitating device;

an exit tube *having an entry way* exiting from the bottom portion of the container [and leading to] *and configured to lead to lead to* an inlet tube of [the] *a* paintball gun, *the exit tube including a sloped exit portion*;

a tube extension mounted on an interior surface of the container adjacent to the exit tube, *the tube extension mounted at a height which is above the top feed surface of the fins and having a radius of curvature that is approximately equal to the radius of a paintball*;

a deflector for deflecting paintballs downward into the gaps between the fins or upward to pass over the tube extension, said deflector *having a first end* pivotably attached to the interior surface of the container *separately from* and adjacent to the tube extension,

*said deflector having a free end that extends away from the first end into the interior space of the container and pivots away from a paintball driven toward the entry way by the paintball agitating device,* said deflector being mounted at a height above a top surface of the agitating device [and below a bottom portion of the tube extension]; and means for actuating the motor upon demand*;*

*wherein the means for actuating the motor upon demand includes a detector for detecting a presence of paintballs at a selected position within the exit tube;*

*wherein said means for actuating the motor upon demand includes a microprocessor which variably controls a speed of the motor, said microprocessor decreasing the speed of the motor when receiving a signal from the detector that the presence of paintballs is detected in the exit tube and increasing the speed of the motor when receiving a signal from the detector that paintballs are not present in the exit tube.*

[2. The rapid feed paintball loader of claim 1 wherein:

the paintball agitating device includes:

a drive cone rotatably mounted on a bottom portion of the container, said drive cone having a top feed surface that slopes downward from a center axis of said drive cone; and a plurality of fins affixed to the top fee d surface of the drive cone, each fin having a top feed surface and forming a gap with an adjacent fin large enough to accommodate a paintball;

the exit tube includes a sloped exit portion; and the tube extension is mounted at a height which is above the top feed surface of the fins and having a radius of curvature that is approximately equal to the radius of a paintball.]

3. The rapid feed paintball loader of claim [2] *1*, wherein the motor is a DC electric motor.

[4. The rapid feed paintball loader of claim 2, the means for actuating the motor upon demand includes a detector for detecting a presence of paintballs at a selected position within the exit tube.]

[5. The rapid feed paintball loader of claim 4, wherein said means for actuating the motor upon demand includes a microprocessor which variably controls a speed of the motor, said microprocessor decreasing the speed of the motor when receiving a signal from the detector that the presence of paintballs is detected in the exit tube and increasing the speed of the motor when receiving a signal from the detector that paintballs are not present in the exit tube.]

6. The rapid feed paintball loader of claim [4] *1*, wherein said detector is a reflective infrared optical sensor.

7. The rapid feed paintball loader of claim [4] *1*, wherein said detector is an optical sensor.

8. The rapid feed paintball loader of claim [4] *1*, wherein said detector is an electromechanical switch.

9. [The rapid feed paintball loader of claim 4,] *A rapid feed paintball loader for use on a paintball gun, the paintball loader comprising:*

*a container for holding a plurality of paintballs having an interior space;*

*a paintball agitating device mounted on a bottom portion of the container, said paintball agitating device including fins, said fins forming gaps therebetween;*

*wherein the paintball agitating device includes a drive cone rotatably mounted on a bottom portion of the container, said drive cone having a top feed surface that slopes downward from a center axis of said drive cone; and*

*a plurality of fins affixed to the top feed surface of the drive cone, each fin having a top feed surface and forming a gap with an adjacent fin large enough to accommodate a paintball;*

*a motor that rotates the paintball agitating device;*

*an exit tube having an entry way exiting from the bottom portion of the container and configured to lead to an inlet tube of a paintball gun, wherein the exit tube includes a sloped exit portion;*

*a tube extension mounted on an interior surface of the container adjacent to the exit tube, the tube extension mounted at a height which is above the top feed surface of the fins and having a radius of curvature that is approximately equal to the radius of a paintball;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension; and*

*means for actuating the motor upon demand;*

*wherein the means for actuating the motor upon demand includes a detector for detecting a presence of paintballs at a selected position within the exit tube;* further comprising a microprocessor communicating with the detector and the motor.

10. The rapid feed paintball loader of claim 9 wherein said microprocessor momentarily stops the motor when said microprocessor detects a specified increase in torque output from the motor.

11. The rapid feed paintball loader of claim 10, further comprising a display positioned on the container and wherein said microprocessor displays relevant data to an operator of [the] *a* paintball gun on the display.

12. The rapid feed paintball loader of claim 11, wherein said display includes a timer.

13. The rapid feed paintball loader of claim 12 wherein said timer emits an audio warning after a preselected time has elapsed.

14. The rapid feed paintball loader of claim 12 wherein said timer displays a visual warning after a preselected time has elapsed.

15. The rapid feed paintball loader of claim 12 wherein said time provides a vibratory alert after a preselected time has elapsed.

16. [The rapid feed paintball loader of claim 4,] *A rapid feed paintball loader for use on a paintball gun, the paintball loader comprising:*

*a container for holding a plurality of paintballs having an interior space;*

*a paintball agitating device mounted on a bottom portion of the container, said paintball agitating device including fins, said fins forming gaps therebetween;*

*wherein the paintball agitating device includes a drive cone rotatably mounted on a bottom portion of the container, said drive cone having a top feed surface that slopes downward from a center axis of said drive cone; and*

*a plurality of fins affixed to the top feed surface of the drive cone, each fin having a top feed surface and forming a gap with an adjacent fin large enough to accommodate a paintball;*

*a motor that rotates the paintball agitating device;*

*an exit tube having an entry way exiting from the bottom portion of the container and configured to lead to an inlet tube of a paintball gun, wherein the exit tube includes a sloped exit portion;*

*a tube extension mounted on an interior surface of the container adjacent to the exit tube, the tube extension mounted at a height which is above the top feed surface of the fins and having a radius of curvature that is approximately equal to the radius of a paintball;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension; and*

*means for actuating the motor upon demand;*

*wherein the means for actuating the motor upon demand includes a detector for detecting a presence of paintballs at a selected position within the exit tube;* wherein said means for actuating the motor upon demand includes a microprocessor which disengages the motor when receiving a signal from the detector that the presence of paintballs is detected in the exit tube.

17. The rapid feed paintball loader of claim 16 wherein said microprocessor momentarily reverses a rotational direction of the motor when said microprocessor detects a specified increase in torque output from the motor.

18. The rapid feed paintball loader of claim [2] *9* wherein the sloped exit portion has a slope approximately equivalent to the slope of the top feed surface of the drive cone.

19. The rapid feed paintball loader of claim [2] *9* wherein the exit tube is horizontally orientated approximately 45 degrees from a horizontal axis running through a mid-position of the paintball loader.

20. The rapid feed paintball loader of claim [2] *9* wherein the plurality of fins spiral outwardly from an interior dome-shaped area located within the center of the drive cone.

21. The rapid feed paintball loader of claim [2] *9* wherein said plurality of fins spiraling outwardly from an interior area of the drive cone.

22. [The rapid feed paintball loader of claim 1 further comprising:] *A rapid feed paintball loader for use on a paintball gun, the paintball loader comprising:*

*a container for holding a plurality of paintballs having an interior space;*

*a paintball agitating device mounted on a bottom portion of the container, said paintball agitating device including fins, said fins forming gaps therebetween;*

*a motor that rotates the paintball agitating device;*

*an exit tube having an entry way exiting from the bottom portion of the container and configured to lead to an inlet tube of a paintball gun;*

*a tube extension mounted on an interior surface of the container adjacent to the exit tube;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension;*

*means for actuating the motor upon demand;* a detector for detecting a presence of paintballs at a selected position within the exit tube; and a microprocessor communicating with the detector and the motor.

23. The rapid feed paintball loader of claim 22 further comprising a display positioned on the container and wherein said microprocessor displays relevant data to an operator of [the] *a* paintball gun on the display.

24. A rapid feed paintball loader for use on a paintball gun, the paintball loader comprising:

a container for holding a plurality of paintballs;

a plurality of fins located at a bottom portion of the container, each fin [having a top feed surface and] forming a gap with an adjacent fin large enough to accommodate a paintball;

means for rotating the plurality of fins about an axis running perpendicularly through the bottom portion of the container;

an exit tube exiting from the bottom portion of the container [and leading to] *and configured to lead to* an inlet tube of [the] *a* paintball gun, said exit tube having a sloped exit portion;

a tube extension mounted on an interior surface of the container adjacent to the sloped exit portion of the exit tube, said tube extension being mounted at a height which is above the top feed surface of the fins and having a radius of curvature that is approximately equal to the radius of a paintball;

a deflector for deflecting paintballs downward into the gaps between the fins or upward to pass over the tube extension, said deflector pivotably mounted on the interior surface of the container adjacent to the tube extension, said deflector being mounted at a height which is above the top feed surface of the fins and which is below a bottom portion of the tube extension;

a motor that rotates the drive cone; [and]

means for actuating the motor upon demand*;*

*a detector for detecting a presence of paintballs at a selected position within the exit tube; and*

*a microprocessor communicating with the detector and the motor.*

25. A rapid feed paintball loader for use on a paintball gun, the paintball loader comprising:

a container for holding a plurality of paintballs;

a paintball agitating device mounted on a bottom portion of the container;

an exit tube exiting from the bottom portion of the container [and leading to] *and configured to lead to* an inlet tube of [the] *a* paintball gun;

a motor that rotates the paintball agitating device; and means for actuating the motor upon demand, said means for actuating the motor upon demand including:

*a* detector for detecting a presence of paintballs at a selected position within the exit tube; and a microprocessor which variably controls a speed of the motor, said microprocessor decreasing the speed of the motor when receiving a signal from the detector that the presence of paintballs is detected in the exit tube and increasing the speed of the motor when receiving a signal from the detector that paintballs are not present in the exit tube.

*26. The rapid feed paintball loader of claim 27, wherein the motor is a DC electric motor.*

*27. A rapid feed paintball loader for use on a paintball gun, the paintball loader comprising:*

*a container for holding a plurality of paintballs;*

*a paintball agitating device mounted on a bottom portion of the container, and having a plurality of fins, and a plurality of gaps between the fins;*

*a motor that rotates the paintball agitating device;*

*an exit tube having an entry way exiting from the bottom portion of the container, the exit tube including a sloped exit portion;*

*a tube extension mounted on an interior surface of the container adjacent to the exit tube, at least a portion of the tube extension is mounted at a height which is above at least a portion of the paintball agitating device;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension;*

*means for actuating the motor;*

*wherein the means for actuating the motor includes a sensor for detecting a presence of paintballs at a selected position within the exit tube;*

*further comprising a microprocessor which variably controls a speed of the motor, said microprocessor decreasing the speed of the motor when receiving a signal from the sensor that there is a lesser demand for paintballs detected and increasing the speed of the motor when receiving a signal from the sensor that paintballs are in higher demand.*

*28. The rapid feed paintball loader of claim 27, wherein said sensor is a reflective infrared optical sensor.*

*29. The rapid feed paintball loader of claim 27, wherein said sensor is an optical sensor.*

*30. The rapid feed paintball loader of claim 27, wherein said sensor is an electromechanical switch.*

*31. A rapid feed paintball loader for use on a paintball gun, the paintball loader comprising:*

*a container for holding a plurality of paintballs;*

*a paintball agitating device mounted on a bottom portion of the container, and having a plurality of fins, and a plurality of gaps between the fins;*

*a motor that rotates the paintball agitating device;*

*an exit tube having an entry way exiting from the bottom portion of the container, the exit tube including a sloped exit portion;*

*a tube extension mounted on an interior surface of the container adjacent to the exit tube, at least a portion of the tube extension is mounted at a height which is above at least a portion of the paintball agitating device;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension;*

*means for actuating the motor;*

*wherein the means for actuating the motor includes a sensor for detecting a presence of paintballs at a selected position within the exit tube;*

*further comprising a microprocessor communicating with the sensor and the motor.*

*32. The rapid feed paintball loader of claim 31 wherein said microprocessor momentarily stops the motor when said microprocessor detects a specified increase in torque output from the motor.*

*33. The rapid feed paintball loader of claim 32, further comprising a display positioned on the container and wherein said microprocessor displays relevant data to an operator of a paintball gun on the display.*

*34. The rapid feed paintball loader of claim 33, wherein said display includes a timer.*

*35. The rapid feed paintball loader of claim 34 wherein said timer emits an audio warning after a preselected time has elapsed.*

*36. The rapid feed paintball loader of claim 34 wherein said timer displays a visual warning after a preselected time has elapsed.*

*37. The rapid feed paintball loader of claim 34 wherein said time provides a vibratory alert after a preselected time has elapsed.*

*38. A rapid feed paintball loader for use on a paintball gun, the paintball loader comprising:*

*a container for holding a plurality of paintballs having an interior space;*

*a paintball agitating device mounted on a bottom portion of the container, said paintball agitating device including fins, said fins forming gaps therebetween;*

*a motor that rotates the paintball agitating device;*

*an exit tube having an entry way exiting from the bottom portion of the container and configured to lead to an inlet tube of a paintball gun;*

*a tube extension mounted on an interior surface of the container adjacent to the exit tube;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension; and*

*means for actuating the motor upon demand,*

*wherein said means for actuating the motor upon demand includes a microprocessor which disengages the motor when receiving a signal from a detector that the presence of paintballs is detected in the exit tube.*

*39. The rapid feed paintball loader of claim 38 wherein said microprocessor momentarily reverses a rotational direction of the motor when said microprocessor detects a specified increase in torque output from the motor.*

*40. The rapid feed paintball loader of claim 27 wherein the sloped exit portion has a slope approximately equivalent to the slope of the top feed surface of the drive cone.*

*41. The rapid feed paintball loader of claim 27 wherein the exit tube is horizontally orientated approximately 45 degrees from a horizontal axis running through a mid-position of the paintball loader.*

*42. The rapid feed paintball loader of claim 27 wherein the paintball agitating device comprises a drive cone rotatably mounted on a bottom portion of the container, said drive cone having a top surface at least a portion of which slopes downward from a center axis of said drive cone; and a plurality of fins affixed to the top surface of the drive cone, each fin forming a gap with an adjacent fin large enough to accommodate a paintball; and wherein the plurality of fins project outwardly from an interior dome-shaped area located within the center of the drive cone.*

*43. The rapid feed paintball loader of claim 27 wherein the paintball agitating device includes: a drive cone rotatably mounted on a bottom portion of the container, said drive cone having a top surface that slopes downward from a center axis of said drive cone; and a plurality of fins affixed to the top surface of the drive cone, each fin forming a gap with an adjacent fin large enough to accommodate a paintball; the exit tube includes a sloped exit portion; and the tube extension is mounted at a height which is above the top surface of the fins.*

*44. A rapid feed paintball loader for use on a paintball gun, the paintball loader comprising:*

*a container for holding a plurality of paintballs;*

*a paintball agitating device mounted on a bottom portion of the container, and having a plurality of fins, and a plurality of gaps between the fins;*

*a motor that rotates the paintball agitating device;*

*an exit tube having an entry way exiting from the bottom portion of the container;*

*a tube extension mounted on an interior surface of the container adjacent to the exit tube;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension;*

*means for actuating the motor;*

*a detector for detecting a presence of paintballs at a selected position within the exit tube; and*

*a microprocessor communicating with the detector and the motor.*

*45. The rapid feed paintball loader of claim 31 further comprising a display positioned on the container and wherein said microprocessor displays relevant data to an operator of a paintball gun on the display.*

*46. A rapid feed paintball loader for use on a paintball gun, the paintball loader comprising:*

*a container for holding a plurality of paintballs, the container having an interior space;*

*a plurality of fins located at a bottom portion of the container, each fin forming a gap with an adjacent fin large enough to accommodate a paintball;*

*a motor for rotating the plurality of fins about an axis running perpendicularly through the bottom portion of the container;*

*an exit tube having an entry way exiting from the bottom portion of the container and configured to lead to an inlet tube of a paintball gun, said exit tube having a sloped exit portion;*

*a tube extension mounted on an interior surface of the container adjacent to the sloped exit portion of the exit tube, and;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension; and*

*means for actuating the motor;*

*further comprising a microprocessor in communication with a sensor and the motor, the microprocessor controlling operation of the motor in response to a signal from the sensor.*

*47. A rapid feed paintball loader for use on a paintball gun, the paintball loader comprising:*

*a container for holding a plurality of paintballs having an interior space;*

*a drive cone that includes a plurality of fins rotatably mounted on the bottom portion of the container, each of the fins forming a gap with an adjacent fin large enough to accommodate a paintball;*

*a motor for operating the paintball agitating device;*

*an exit tube having an entry way;*

*a tube extension mounted on an interior surface of the container adjacent to the exit tube; and,*

*a deflector for deflecting paintballs downward into the gaps between the fins or upward to pass over the tube extension, said deflector having a first end pivotably attached to the interior surface of the container separately from and adjacent to the tube extension,*

*said deflector having a moveable free end that extends away from the first end into the interior space of the container and moves away from a paintball driven toward the entry way by the paintball agitating device,*

*said deflector being mounted at a height above a top surface of the paintball agitating device;*

*a detector for detecting paintballs; and,*

*a microprocessor which variably controls a speed of the motor, said microprocessor decreasing the speed of the motor when receiving a signal from the detector that the presence of paintballs is detected in the exit tube and increasing the speed of the motor when receiving a signal from the detector that paintballs are not present in the exit tube.*

*48. The rapid feed paintball loader of claim 46, wherein the sensor is adapted to send a signal to the microprocessor when the exit tube has a number of paintballs, and the microprocessor is adapted to stop the motor in response to the signal.*

*49. A rapid feed paintball loader for use on a paintball gun, the paintball loader comprising:*

*a container for holding a plurality of paintballs;*

*a paintball agitating device mounted on a bottom portion of the container;*

*an exit tube exiting from the bottom portion of the container;*

*a motor for operating the paintball agitating device;*

*a sensor for detecting at least one paintball at a selected position within the exit tube; and,*

*a microprocessor which variably controls a speed of the motor, said microprocessor decreasing the speed of the motor when receiving a signal from the sensor that the presence of paintballs is detected in the exit tube and increasing the speed of the motor when receiving a signal from the sensor that paintballs are not present in the exit tube.*

*50. The rapid feed paintball loader of claim 49, wherein the sensor is adapted to detect a presence of the at least one paintball at a selected position within the exit tube.*

*51. The rapid feed paintball loader of claim 49, wherein the sensor is adapted to send a signal to the microprocessor when the exit tube has a number of paintballs therein, wherein the microprocessor is adapted to stop the motor in response to the signal.*

*52. A rapid feed paintball loader for use on a paintball gun, the paintball loader comprising:*

*a container for holding a plurality of paintballs;*

*a paintball agitating device mounted on a bottom portion of the container;*

*a motor for operating the paintball agitating device;*

*an exit tube exiting from the bottom portion of the container and configured to lead to an inlet tube of a paintball gun, the exit tube having an exit opening;*

*a tube extension adjacent the exit opening;*

*a sensor for detecting at least one paintball at a selected position within the exit tube; and,*

*and a microprocessor which variably controls a speed of the motor, said microprocessor decreasing the speed of the motor when receiving a signal from the sensor that the presence of paintballs is detected in the exit tube and*

*increasing the speed of the motor when receiving a signal from the sensor that paintballs are not present in the exit tube.*

*53. The rapid feed paintball loader of claim 52, wherein the sensor is adapted to send a signal to the microprocessor when the exit tube has a number of paintballs therein, wherein the microprocessor is adapted to stop the motor in response to the signal.*

*54. The rapid feed paintball loader of claim 52, further comprising a deflector pivotably attached to the interior surface of the container adjacent to the tube extension.*

*55. The rapid feed paintball loader of claim 54, wherein the paintball agitating device is a drive cone rotatably mounted on the bottom portion of the container having a plurality of fins, each of the fins forming a gap with an adjacent one of the fins large enough to accommodate a paintball, and wherein the deflector is positioned to deflect paintballs downward into the gaps between the fins or upward to pass over the tube extension.*

*56. The rapid feed paintball loader of claim 52, wherein the sensor is adapted to detect a presence of a paintball at a selected position within the exit tube.*

*57. The rapid feed paintball loader of claim 52, wherein said sensor is a reflective infrared optical sensor.*

*58. The rapid feed paintball loader of claim 52, wherein said sensor is an optical sensor.*

*59. The rapid feed paintball loader of claim 52, wherein said sensor is an electromechanical switch.*

*60. The rapid feed paintball loader of claim 52, wherein said microprocessor is adapted to momentarily stop the motor upon detection of a specified increase in torque output from the motor.*

*61. The rapid feed paintball loader of claim 52, wherein the microprocessor is adapted to record relevant data relating to use of the paintball loader, further comprising a display in communication with the microprocessor positioned on the container.*

*62. The rapid feed paintball loader of claim 61, wherein said display includes a timer.*

*63. The rapid feed paintball loader of claim 62, wherein said timer is adapted to emit an audio warning after a preselected time has elapsed.*

*64. The rapid feed paintball loader of claim 62, wherein said timer is adapted to display a visual warning after a preselected time has elapsed.*

*65. The rapid feed paintball loader of claim 62, wherein said timer is adapted to provide a vibratory alert after a preselected time has elapsed.*

*66. The rapid feed paintball loader of claim 61, wherein the display is adapted to show information relating to the power remaining in the power supply.*

*67. The rapid feed paintball loader of claim 52, wherein the paintball agitating device is a drive cone.*

*68. A rapid feed paintball loader for use on a paintball gun, the paintball loader comprising:*

*a container for holding a plurality of paintballs having an interior area;*

*a tube extension projecting into the interior area and positioned adjacent to the exit tube;*

*a paintball agitating device mounted on a bottom portion of the container;*

*a motor that rotates the paintball agitating device;*

*an exit tube exiting from the bottom portion of the container and configured to lead to an inlet tube of a paintball gun, the exit tube having an exit opening;*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension; and means for actuating the motor upon demand;*

*a sensor for detecting at least one paintball at a selected position within the exit tube; and*

*a microprocessor communicating with the sensor and the motor, the microprocessor controlling the motor's speed when the motor is actively operating the paintball agitating device, and automatically increasing an existing rate of speed of the motor in response to a signal from the sensor indicating an increased demand for paintballs.*

*69. The rapid feed paintball loader of claim 68, wherein the sensor is adapted to send a signal to the microprocessor when the exit tube has a number of paintballs, and the microprocessor is adapted to stop the motor in response to the signal.*

*70. The rapid feed paintball loader of claim 68, wherein the sensor detects a presence of paintballs at a selected position within the exit tube.*

*71. The rapid feed paintball loader of claim 68, wherein the microprocessor is adapted to variably control a speed of the motor, said microprocessor adapted to decrease the speed of the motor when receiving a signal from the sensor that the presence of paintballs is detected in the exit tube and adapted to increase the speed of the motor when receiving a signal from the sensor that paintballs are not present in the exit tube.*

*72. The rapid feed paintball loader of claim 68, wherein said sensor is a reflective infrared optical sensor.*

*73. The rapid feed paintball loader of claim 68, wherein said sensor is an optical sensor.*

*74. The rapid feed paintball loader of claim 68, wherein said sensor is an electromechanical switch.*

*75. The rapid feed paintball loader of claim 68, wherein said microprocessor is adapted to momentarily stop the motor upon detection of an increase in torque output from the motor.*

*76. The rapid feed paintball loader of claim 68, wherein the microprocessor is adapted to record relevant data relating to use of the paintball loader, the loader further comprising a display in communication with the microprocessor positioned on the container.*

*77. The rapid feed paintball loader of claim 76, wherein said display includes a timer.*

*78. The rapid feed paintball loader of claim 77, wherein said timer is adapted to emit an audio warning after a preselected time has elapsed.*

*79. The rapid feed paintball loader of claim 77, wherein said display is adapted to display a visual warning after a preselected time has elapsed as measured by the timer.*

*80. The rapid feed paintball loader of claim 77, wherein said display is adapted to provide a vibratory alert after a preselected time has elapsed as measured by the timer.*

*81. The rapid feed paintball loader of claim 76, wherein the timer is adapted to display shows information relating to the power remaining in the power supply.*

*82. The rapid feed paintball loader of claim 67, wherein the paintball agitating device is a drive cone.*

*83. A paintball loader, comprising:*

*a container for holding a plurality of paintballs;*

*a paintball agitating device mounted in the container;*

*an exit tube exiting from the container;*

*a motor for operating the paintball agitating device; and*

*a sensor for detecting a presence of a paintball at a selected position within the exit tube; and*

*a microprocessor in communication with the sensor and motor,*

*the microprocessor which variably controls a speed of the motor, the microprocessor decreasing the speed of the motor when receiving a signal from the sensor that the presence of paintballs is detected in the exit tube and increasing the speed of the motor when receiving a signal from the sensor that paintballs are not present in the exit tube.*

*84. The paintball loader of claim 83, wherein the motor is a reversible DC electric motor.*

*85. The paintball loader of claim 83, wherein the sensor comprises a reflective infrared optical sensor.*

*86. The rapid feed paintball loader of claim 83, wherein said sensor comprises a combination of optical sensors or infrared sensors.*

*87. The rapid feed paintball loader of claim 83, wherein said sensor comprises an electromechanical device.*

*88. The paintball loader of claim 83, wherein the microprocessor is adapted to detect an increase in torque output from the motor, and the microprocessor is adapted to momentarily stop or reverse a rotational direction of the motor upon detection of the increase in torque.*

*89. The paintball loader of claim 83, further comprising a display positioned on the container, and wherein the microprocessor is adapted to display data to an operator of a paintball gun via the display.*

*90. The paintball loader of claim 89, wherein the display includes a timer.*

*91. A method for operating a paintball loader, the method comprising the steps of:*

*(a) providing a container for holding paintballs;*

*(b) providing an exit tube exiting from the container;*

*(c) providing a paintball agitating device mounted in the container;*

*(d) providing a motor for operating the paintball agitating device;*

*(e) providing a sensor adapted to detect a paintball; and,*

*(f) providing a microprocessor in communication with the sensor and motor, the microprocessor variably controlling a speed of the motor, said microprocessor decreasing the speed of the motor when receiving a signal from the sensor that the presence of paintballs is detected in the exit tube and increasing the speed of the motor when receiving a signal from the sensor that paintballs are not present in the exit tube.*

*92. The method for operating a paintball loader of claim 91, further comprising the step of reversing a direction of the motor.*

*93. The method for operating a paintball loader of claim 91, wherein the sensor is adapted to detect paintballs passing through the exit tube.*

*94. The method for operating a paintball loader of claim 91, wherein the sensor is adapted to detect a demand for paintballs.*

*95. A method for operating a paintball loader, the method comprising the steps of:*

*(a) providing a container for holding paintballs;*

*(b) providing an exit tube exiting from the container;*

*(c) providing a tube extension mounted on an interior surface of the container adjacent to the exit tube;*

*(d) providing a paintball agitating device mounted in the container, said paintball agitating device including a plurality of fins, said fins forming gaps therebetween*

*(e) providing a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension;*

*(f) providing a motor for rotating the paintball agitating device;*

*(g) providing a microprocessor in communication with the motor and a sensor, the microprocessor configured to automatically control the direction of rotation of the motor, the microprocessor processing a signal generated in response to the detection of a paintball;*

*(h) reversing a direction of the motor in response to the signal; and,*

*(i) automatically operating the motor in its original direction after the paintball jam has cleared.*

*96. A method for operating a paintball loader, the method comprising the steps of:*

*(a) providing a container for holding paintballs;*

*(b) providing a paintball agitating device within the container adapted to move in either a first direction or in a second opposite direction;*

*(c) moving the paintballs using the paintball agitating device in the first direction toward an exit opening formed within the paintball loader, the paintball agitating device operated by a microprocessor-controlled motor, the microprocessor in communication with a sensor, the microprocessor variably controlling a speed of the motor, the microprocessor decreasing the speed of the motor when receiving a signal from the sensor that the presence of paintballs is detected in the exit tube and increasing the speed of the motor when receiving a signal from the sensor that paintballs are not present in the exit tube;*

*(d) detecting a paintball jam within the paintball loader with the sensor;*

*(e) sending a signal to the microprocessor indicating the paintball jam;*

*(f) stopping the motor in response to the signal received by the microprocessor indicating the paintball jam; and,*

*(f) automatically starting the motor after the paintball jam has cleared.*

*97. A paintball loader, comprising:*

*a container for holding a plurality of paintballs;*

*an exit tube exiting from the container;*

*a tube extension adjacent the exit tube;*

*a paintball agitating device mounted in the container, said paintball agitating device including a plurality of fins, said fins forming gaps therebetween*

*a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension; and,*

*a reversible motor that rotates the paintball agitating device in either a first direction or in a second direction opposite the first direction, the operation of the motor controlled by a microprocessor in communication with a sensor, the microprocessor configured to change the motor's rotational direction from a first direction to a second direction in response to the sensor detecting a paintball jam, the microprocessor configured to automatically command the motor to rotate in the first direction after the paintball jam clears.*

*98. A method for operating a paintball loader, comprising the steps of:*

*(a) providing a container for holding a plurality of paintballs, the container including an exit tube exiting from the container, and a tube extension mounted on an interior surface of the container adjacent to the exit tube;*

*(b) providing a paintball agitating device including mounted in the container, said paintball agitating device including a plurality of fins, said fins forming gaps therebetween, said paintball agitating device further including a deflector for deflecting paintballs downward into the gaps between the fins or upward to pass over the tube extension, said deflector pivotably attached to the interior surface of the container adjacent to the tube extension, said deflector being mounted at a height above a top surface of the agitating device and below a bottom portion of the tube extension;*

*(c) providing a motor for operating the paintball agitating device, the operation of the motor controlled by a microprocessor in communication with a sensor, the microprocessor controlling the motor's speed when the motor is actively operating the paintball agitating device, and automatically increasing an existing rate of speed of the motor in response to a signal from the sensor indicating an increased demand for paintballs; and,*

*(d) operating the motor in a first direction to forcibly drive paintballs within the container into the exit tube; and,*

*(e) automatically operating the motor in a second direction in response to a paintball jam.*

*99. The method for operating a paintball loader according to claim 97, further comprising the step of providing a sensor for detecting paintballs within the exit tube.*

*100. The method for operating a paintball loader according to claim 99, further comprising the step of providing a microprocessor in communication with the sensor and motor.*

*101. The method for operating a paintball loader according to claim 100, further comprising the step of controlling operation of the motor in response to signals transmitted from the sensor to the microprocessor.*

*102. The method for operating a paintball loader according to claim 101, further comprising the step of reversing a direction of the paintball agitating device.*

*103. A rapid feed paintball loader for use on a paintball gun for force feeding paintballs, the paintball loader comprising:*

*a container for holding a plurality of paintballs;*

*a paintball agitator rotatably mounted on a bottom portion of said container;*

*at least one fin extending from the agitator, said fin forming a gap large enough to accommodate a paintball;*

*a motor that rotates said drive cone;*

*an exit tube exiting from the bottom portion of said container and configured to lead to an inlet tube of a paintball gun;*

*and microprocessor for controlling said motor in communication with the motor and a sensor;*

*whereby said agitator is adapted to receive paintballs from the container and forcibly drive the paintballs from the gap into the exit tube;*

*the operation of the motor controlled by the microprocessor, the microprocessor configured to stop the motor in response to the sensor detecting a paintball jam, the microprocessor variably controlling a speed of the motor, said microprocessor decreasing the speed of the motor when receiving a signal from the sensor that the presence of paintballs is detected in the exit tube and increasing the speed of the motor when receiving a signal from the sensor that paintballs are not present in the exit tube.*

*104. The rapid feed paintball loader of claim 103, wherein the sensor is configured to detect a paintball.*

*105. The rapid feed paintball loader of claim 104, wherein the sensor is an electro-mechanical switch.*

*106. The rapid feed paintball loader of claim 104, wherein the sensor is a reflective infrared sensor.*

*107. The rapid feed paintball loader of claim 103, wherein the paintball agitating device is a drive cone, and wherein the fin separates the top feed surface of the drive cone into at least one gap large enough to accommodate a paintball.*

*108. The rapid feed paintball loader of claim 107, wherein the drive cone includes a dome-shaped area located proximate its center; and the at least one fin projects outwardly from the dome-shaped area.*

*109. A rapid feed paintball loader for use on a paintball gun, the paintball loader comprising:*

*a container for holding a plurality of paintballs;*

*a paintball agitating device mounted on a bottom portion of the container;*

*an exit tube exiting from the bottom portion of the container;*

*a motor for operating the paintball agitating device;*

*a plurality of sensors for detecting a demand for paintballs; and*

*a microprocessor in communication with the sensors and motor, the microprocessor adapted to control the motor when receiving a signal from at least one of the sensors, the microprocessor variably controlling a speed of the motor, said microprocessor decreasing the speed of the motor when receiving a signal from at least one of the sensors that the presence of paintballs is detected in the exit tube and increasing the speed of the motor when receiving a signal from at least one of the sensors that paintballs are not present in the exit tube.*

*110. The paintball loader of claim 109, wherein the microprocessor is adapted to detect an increase in torque output from the motor, and the microprocessor is adapted to momentarily stop or reverse a rotational direction of the motor upon detection of the increase in torque.*

*111. The paintball loader of claim 109, wherein the microprocessor variably controls a speed of the motor, said microprocessor decreasing the speed of the motor when receiving a signal from a sensor that there is a lesser demand for paintballs detected and increasing the speed of the motor when receiving a signal from the sensor that paintballs are in higher demand.*

* * * * *